United States Patent [19]

Yamaya et al.

[11] Patent Number: 5,104,962

[45] Date of Patent: Apr. 14, 1992

[54] THERMOSETTING RESIN COMPOSITION FROM PENTAPHENYLENE DIAMINE

[75] Inventors: Norimasa Yamaya, Yokohama; Masahiro Ohta, Ohmuta; Akihiro Yamaguchi, Kamakura, all of Japan

[73] Assignee: Mitsui Toatsu Chemicals, Inc., Tokyo, Japan

[21] Appl. No.: 601,425

[22] Filed: Oct. 23, 1990

[30] Foreign Application Priority Data

Apr. 6, 1990 [JP] Japan ................................. 2-90113
Apr. 9, 1990 [JP] Japan ................................. 2-92197
Apr. 9, 1990 [JP] Japan ................................. 2-92198

[51] Int. Cl.$^5$ ............................................. C08G 73/12
[52] U.S. Cl. ................................... 528/170; 528/185; 528/220; 528/229; 528/321; 528/322

[58] Field of Search ............... 528/322, 321, 170, 220, 528/229, 185

[56] References Cited

U.S. PATENT DOCUMENTS 4,923,959  5/1990  Kan et al. ............................ 528/322
4,966,961 10/1990  Tanabe et al. .

Primary Examiner—Harold D. Anderson
Attorney, Agent, or Firm—Burns, Doane, Swecker & Mathis

[57] ABSTRACT

Disclosed is a thermosetting resin composition which comprises a specific bismaleimide compound or polymaleimide and a specific aromatic diamine compound. It can be widely used for electrical and electronic parts, various structural parts, sliding parts and the like.

10 Claims, No Drawings

THERMOSETTING RESIN COMPOSITION FROM PENTAPHENYLENE DIAMINE

BACKGROUND OF THE INVENTION

The present invention relates to a novel thermosetting resin composition which can provide excellent mechanical properties, particularly impact resistance and toughness, without impairing heat resistance.

Thermosetting resins having an imido structure provide excellent electrical insulating properties, heat resistance and dimensional stability to molded articles obtained therefrom. Therefore, they have been widely used in industrial fields.

However, while thermosetting resins obtained by using an aromatic bismaleimide are insoluble and unmeltable and have excellent heat resistance, they are inconveniently brittle and provide poor impact resistance and toughness. In order to eliminate these drawbacks, attempts have been made to use a thermosetting resin composition comprising an aromatic bismaleimide and an aromatic diamine. For example, polyaminobismaleimide resin (made by Rhone-Poulenc, trade name "Kelimide") comprising N,N'-4,4'-diphenylmethanebismaleimide and 4,4'-diaminodiphenylmethane has been widely used as an impregnating varnish, laminate and molded article (Japanese Patent Publication No. 46-23250). Unfortunately, this type of thermosetting resin composition still provides insufficient heat resistance and unsatisfactory impact resistance and toughness. In addition, 4,4'-diaminodiphenylmethane is toxic to humans.

SUMMARY OF THE INVENTION

Accordingly, an object of the present invention is to provide a novel thermosetting resin composition having excellent impact resistance and toughness which includes a specific bismaleimide compound or polymaleimide and an aromatic diamine compound.

That is, according to the first aspect of the present invention, there is provided a thermosetting resin composition comprising a diamine compound represented by formula (I):

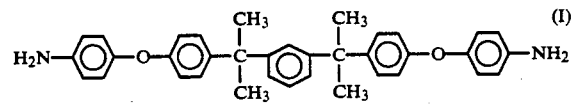

and a bismaleimide compound represented by formula (II):

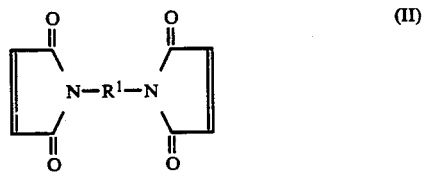

wherein $R^1$ is

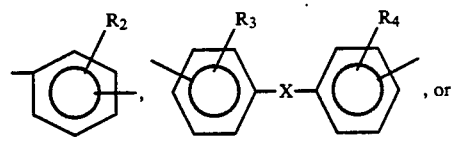

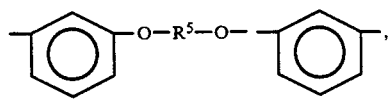

each of $R^2$, $R^3$ and $R^4$, which may be the same or different, is a hydrogen atom or a methyl group, X is a direct bond, $CH_2$, an oxygen atom, a sulfur atom, $SO_2$, CO or

and $R^5$ is a divalent group of

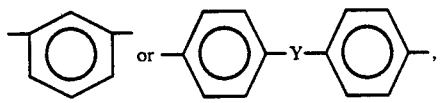

Y is a direct bond or a group selected from the group consisting of a divalent hydrocarbon groups having 1 to 10 carbon atoms, a hexafluorinated isopropylidene group, a carbonyl group, a thio group, a sulfinyl group, a sulfonyl group and an oxo group.

Furthermore, according to the second aspect of the invention, there is provided a thermosetting resin composition comprising the above-mentioned diamine compound of formula (I) and a polymaleimide compound represented by formula (III):

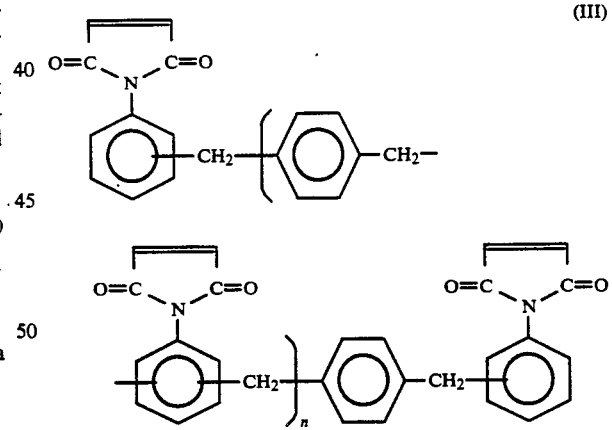

wherein n is an integer of from 0 to 50.

DETAILED DESCRIPTION OF THE INVENTION

A suitable diamine compound of formula (I) used according to the present invention is 1,3-bis[4-(4-aminophenoxy)-α,α-dimethylbenzyl]benzene which is described in U.S. Ser. No. 601,424, filed concurrently herewith, the contents of which are hereby incorporated by reference. Advantageously, the above-mentioned compound can be prepared industrially in high purity and high yield by condensing 1,3-bis[4-(4-hydroxy-α,α-dimethylbenzyl]-benzene and p-nitrochlorobenzene in the presence of a base in a non-protonic polar solvent, followed by reduction.

Examples of the bismaleimide compound represented by formula (II) containing $R^2$ or $R^3$ and $R^4$ which can be used in the present invention include N,N'-p-phenylenebismaleimide, N,N'-m-phenylenebismaleimide, N,N'-2,4-toluylenebismaleimide, N,N'-2,6-toluylenebismaleimide, N,N'-4,4'-diphenylmethanebismaleimide, N,N'-3,3'-diphenylmethanebismaleimide, N,N'-4,4'-diphenyletherbismaleimide, N,N'-3,3'-diphenyletherbismaleimide, N,N'-4,4'-diphenylsulfidobismaleimide, N,N'-3,3'-diphenylsulfidobismaleimide, N,N'-4,4'-diphenylsulfonbismaleimide, N,N'-3,3'-diphenylsulfonbismaleimide, N,N'-4,4'-diphenylketonbismaleimide, N,N'-3,3'- diphenylketonbismaleimide, N,N'-4,4'-biphenyl- bismaleimide, N,N'-3,3'-biphenylbismaleimide, N,N'-4,4'-diphenyl-1,1-propanebismaleimide, N,N'-3,3'-diphenyl-1,1-propanebismaleimide, 3,3'-dimethyl-N,N'-4,4'-diphenylmethanebismaleimide and 3,3'-dimethyl-N,N'-biphenylbismaleimide. They may be used alone or as mixtures of two or more.

Furthermore, the bismaleimide compound represented by general formula (II) containing an $R^5$ group can be prepared by a known process, i.e., by condensing/dehydrating maleic anhydride and a diamine compound represented by the general formula (IV):

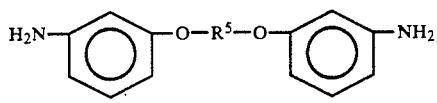
(IV)

In formula (IV), $R^5$ is a divalent group of

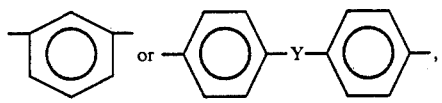

where Y is a direct bond or a group selected from the group consisting of divalent hydrocarbon groups having 1 to 10 carbon atoms, a hexafluorinated isopropylidene group, a carbonyl group, a thio group, a sulfinyl group, a sulfonyl group and an oxo group).

Typical examples of the above-mentioned bismaleimide compound include 1,3-bis(3-maleimidophenoxy)-benzene, bis[4-(3-maleimidophenoxy)-phenyl]-methane, 1,1-bis[4-(3-maleimidophenoxy)-phenyl]ethane, 1,2-bis[4-(3-maleimidophenoxy)- phenyl]ethane, 2,2-bis-[4-(3-maleimidophenoxy)phenyl]propane, 2,2-bis[4-(3-maleimidophenoxy)phenyl]butane, 2,2-bis[4-(3-maleimidophenoxy)phenyl]-1,1,1,3,3,3-hexafluoropropane, 4,4'-bis(3-maleimidophenoxy)biphenyl, bis[4-(3-maleimidophenoxy)phenyl]-ketone, bis[4-(3-maleimidophenoxy)phenyl] sulfide, bis[4-(3-maleimidophenoxy)-phenyl] sulfoxide, bis[4-(3-maleimidophenoxy)phenyl]-sulfone and bis[4-(3-maleimidophenoxy)phenyl] ether. These compounds can be used alone or in mixtures of two or more.

The polymaleimide represented by general formula (III) can be easily prepared by condensing/dehydrating maleic anhydride and an aromatic amine represented by general formula (V):

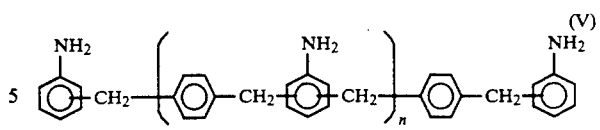

wherein n is an integer of from 0 to 50.

Aromatic amines represented by general formula (V) are described in Japanese Patent Application Laid-open Nos. 01-95125 and 01-123828. The amines can be prepared from, for example, aniline and an aralkyl derivative represented by general formula (VI):

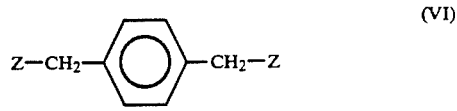

wherein Z is a halogen, a hydroxyl group or an alkoxy group.

As described above, the thermosetting resin composition of the present invention can be prepared from the diamine compound of formula (I) and the bismaleimide compound of formula (II) or the polymaleimide of formula (III). The following various preparation methods can be selected.

(1) The bismaleimide compound or the polymaleimide and the diamine compound can be mixed and then ground in a solid state, and the ground mixture may be used. Alternatively, the mixture may be further subjected to heat treatment to form a prepolymer, with the latter then being ground to pellets or powder. In this case, heating conditions are preferably such as to partially cure the material up to the level of a prepolymer. In general, it is appropriate if the heat treatment is effected at a temperature of from 70 to 220° C. for 5 to 240 minutes, preferably at 80° to 200° C. for 10 to 180 minutes.

(2) The bismaleimide or the polymaleimide and the diamine can be dissolved in an organic solvent, with the resulting solution being discharged into a poor solvent to precipitate crystals. Afterward, the latter can be collected by filtration, dried and then formed into pellets or powder. Alternatively, the materials can be dissolved in an organic solvent, and then partially cured up to the level of a prepolymer by heat treatment. Afterward, the cured material can be discharged into a poor solvent to precipitate crystals, with the latter being collected by filtration, dried and then formed into pellets or powder. In this case, conditions should conform to those of preceding paragraph (1).

The usable organic solvent must meet the requirement that it does not react with both components, and preferably has the additional function of being a good solvent for both components. Examples of suitable solvents include halogenated hydrocarbons such as methylene chloride, dichloroethane and trichloroethylene; ketones such as acetone, methyl ethyl ketone, cyclohexanone and di-isopropyl ketone; ethers such as tetrahydrofuran, dioxane and methyl cellosolve; aromatic compounds such as benzene, toluene and chlorobenzene; and non-protonic polar solvents such as acetonitrile, N,N-dimethylformamide, N,N-dimethylacetamide, dimethyl sulfoxide, N-methyl-2-pyrrolidone and 1,3-dimethyl-2-imidazolidinone.

The ratio between the diamine compound of formula (I) and the bismaleimide compound of formula (II) should be from 0.1 to 1.2 mols, preferably 0.2 to 0.8 mol of the diamine compound, per mol of the bismaleimide compound. If the ratio is too low, a cured product obtained from such a material will not provide good impact resistance and toughness. When it is too high, the cured product is adversely affected in terms of heat resistance.

Furthermore, the diamine compound represented by formula (I) can be used in a ratio of from 5 to 100 parts by weight, preferable from 10 to 80 parts by weight, per 100 parts by weight of the polymaleimide represented by general formula (III).

When the amount of diamine compound is 5 parts by weight or less, cured articles obtained therefrom will not have satisfactory bending strength. On the other hand, when it is 100 parts by weight or more, the cured articles will have poor heat resistance.

If necessary, additional components can be added to the thermosetting resin forming composition of the present invention, so long as the objects of the present invention are not impaired. Examples of such additional components include curing accelerators such as radical polymerization initiators (e.g, an azo compound or an organic peroxide), or ionic catalysts (e.g., a tertiary amine, a quaternary ammonium salt, an imidazole or a boron trifluoride amine salt); powdery reinforcing materials and fillers such as a metal oxide (e.g., aluminum oxide or magnesium oxide), a metal hydroxide (e.g., aluminum hydroxide), a metal carbonate (e.g., calcium carbonate or magnesium carbonate), diatomaceous earth powder, basic magnesium silicate, calcined clay, finely powdery silica, melted silica, crystalline silica, carbon black, kaolin, finely powdery mica, quartz powder, a metal hydroxide (e.g., aluminum hydroxide), glass beads, graphite, asbestos, molybdenum disulfide, or antimony trioxide; fibrous reinforcing materials and fillers such as an inorganic fiber (e.g, glass fiber, rock wool, ceramic fiber, alumina fiber or potassium titanate fiber) or an organic fiber (e.g., carbon fiber or an aromatic polyamide); and for improving properties of a resin of a final coating film, adhesive layer or molded resin article, a synthetic resin can be blended therewith such as thermosetting resins (e.g., a phenol resin, an epoxy resin, a melamine resin and a silicone resin), polyethylene, propylene, polyamide, polycarbonate, polysulfone, polyether sulfone, polyether ether ketone, modified polyphenylene oxide, polyphenylene sulfide, polyether imide and fluorine-containing resins.

The thermosetting resin composition of the present invention can be molded using known molding techniques such as compression molding, transfer molding, extrusion molding and injection molding.

The present invention will be described in further detail below by reference to certain synthesis examples, examples and comparative examples. These examples, however, should not be construed as in any way limiting the invention.

In the examples below, the physical properties of thermosetting resin compositions were measured by the following procedures.

For GPC Analysis, LC-6A made by Shimadzu Seisakusho Ltd. was used.

Softening Point was measured in accordance with JIS K-2548 (a ring and ball softening point method).

Izod Impact Strength (no notch) was measured in accordance with ASTM-D-256.

Bending Strength and Flexural Modulus were measured in accordance with ASTM-D-790.

For starting Temperature of Thermal Decomposition, a temperature at which weight decrease begins was measured at a temperature rise rate of 10° C./minute in air in accordance with the TGA method.

SYNTHESIS EXAMPLE 1

In a reactor equipped with a stirrer, a reflux condenser, a thermometer, a Dean/Stark water separator and a nitrogen inlet pipe, there were placed 600 g of N,N-dimethylformamide from which water had been removed, 207.6 g (0.6 mol) of 1,3-bis(4-hydroxy-α,α-dimethylbenzyl)benzene, 193.7 g (1.23 mols) of 4-chloronitrobenzene and 248.8 g (1.8 mols) of potassium carbonate, and 50 g of toluene were then added thereto.

The resulting mixture was heated, and stirring was continued for 5 hours, while a temperature of from 140° to 150° C. was maintained, in order to carry out the reaction. Water produced by the reaction was successively removed from the system by azeotropy with toluene.

After completion of the reaction, the resulting inorganic salts were removed by hot filtration, and the filtrate was again heated. While a temperature of from 90° to 95° C. was maintained, 260 g of water was added thereto over 2 hours in order to precipitate 1,3-bis[4-(4-nitrophenoxy)-α,α-dimethylbenzyl]benzene. The solution containing the precipitate was slowly cooled, and the resulting light yellow crystals were collected by filtration, washed with a mixed solvent of N,N-dimethyl-formamide and methanol, sludge-washed with 1 liter of methanol, filtered and then dried. 328 g of light yellow powder was obtained.

Using high-speed liquid chromatography, the purity of the product was determined as being 99.1%. The analytical results were as follows: Melting point: 154.5° to 156.0° C.

Values of elemental analysis:

|  | C | H | N |
| --- | --- | --- | --- |
| Calcd. (%) | 73.47 | 5.44 | 4.76 |
| Found (%) | 73.34 | 5.20 | 4.79 |

IR (KBr tablet method): 1330, 1490 cm$^{-1}$ (a nitro group) 1230 cm$^{-1}$ (an ether bond)

In a reactor equipped with a stirrer, a thermometer, a reflux condenser and a dropping funnel, there were placed 294 g (0.5 mol) of 1,3-bis[4-(4-nitrophenoxy)-α,α-dimethylbenzyl]benzene obtained from the preceding step. This material was then mixed with 1500 g of methyl cellosolve, 29.4 g of active carbon and 2.9 g of ferric chloride-hexahydrate. Afterward, stirring was continued for 3 hours, while a temperature of from 100° to 105° C. was maintained. Wile the temperature was maintained, 150.2 g of 80% hydrazine monohydrate was added dropwise over 3 hours.

The solution was aged at the above temperature for 1 hour. Solids were then removed by hot filtration. Afterward, the resulting filtrate was concentrated and then recrystalized from isopropyl alcohol. White crystals of the desired compound, 1,3-bis]4-(4-aminophenoxy)-α,α-dimethylbenzyl]benzene (hereinafter referred to simply as p-BAC-M), were obtained. The white crystals were then filtered, washed with isopropyl alcohol, and dried to obtain 228.5 g of p-BAC-M.

Using high-speed liquid chromatography, the purity of the product was determined as being 99.0% (total yield 91.4%). The analytical results were as follows:
Melting point: 103° to 105.5° C.
Values of elemental analysis:

|  | C | H | N |
|---|---|---|---|
| Calcd. (%) | 81.82 | 6.82 | 5.30 |
| Found (%) | 81.86 | 6.45 | 5.22 |

IR (KBr tablet method): 1620, 3340-3440 cm$^{-1}$ (an amino group): 1240 cm$^{-1}$ (an ether bond.

EXAMPLES 1 to 3

In a stainless steel reactor equipped with a stirrer, a reflux condenser and nitrogen inlet pipe, there was placed a powdery mixture of 1,3-bis-]4-(4-aminophenoxy)-α,α-dimethylbenzyl]benzene (p-BAC-M) and N,N'-4,4'-diphenylmethanebismaleimide, each in a molar ratio as set forth in Table 1. The mixture was then heated and melted at 180° C. for 20 minutes. Afterward, the mixture was cooled to room temperature in order to obtain a brown transparent glassy solidified reaction product. This product was then ground, such that a yellow fine powder of partially cured thermosetting resin composition was obtained.

A mold (10×80×4 mm) which had been heated to 180° C., was filled with the above composition which was heated and melted. Compression molding was then carried out by maintaining the composition at 200° C. under 50 kg/cm² for 30 minutes. After being cooled to room temperature, the molded material was taken out of the mold and postcured in a hot air oven at 250° C. for 4 hours. Test pieces for an Izod impact test and a bending test were obtained. The Izod impact test (no notch) and the bending test were carried out in accordance with JIS-K-6911, and a starting temperature of thermal decomposition was measured at a temperature rise rate of 10° C./-minute in air. The results are set forth in Table 1.

EXAMPLE 4

In a reactor equipped with a stirrer, a reflux condenser and a nitrogen inlet pipe, there were placed p-BAC-M and N,N'-4,4'-diphenylmethanebismaleimide in the molar ratio shown in Table 1. N-methyl-2-pyrrolidone was further poured into the solution in such an amount that the concentration of a resin was 55% by weight. Both components were dissolved and a reaction was carried out by heating the solution at 130° C. for 50 minutes. The resulting brown transparent varnish was added dropwise to water which was being stirred The deposited precipitate was collected by filtration, washed with water, and then dried with hot air at 80° C. for 15 hours.

The product was further dried at 110° C. for 20 minutes and additionally at 130° C. for 20 minutes. It was then ground to obtain a thermosetting resin composition.

Afterward, the same operation as in Examples 1 to 3 was effected. The results which were obtained are set forth in Table 1.

EXAMPLES 5 TO 11 AND COMPARATIVE EXAMPLES 1 AND 2

Each diamine compound and each bismaleimide compound shown in Table 1, were mixed in the molar ratio set forth in Table 1, and the same operation followed in Examples 1 to 3 was effected. The results are set forth in Table 1.

TABLE 1 (I)

| | Resin Composition | | Molar ratio (I)/(II) | Izod Impact strength (no notch) (kg · cm/cm) | Bending strength (kg/mm²) | Flexural modulus (kg/mm²) | Starting temp. of thermal decomposition (°C.) |
|---|---|---|---|---|---|---|---|
| | Diamine Compound (I) | Bismaleimide Compound (II) | | | | | |
| Example 1 | p-BAC-M* | N,N'-4,4'-diphenyl-methanebismaleimide | 0.2/1.0 | 19 | 11.9 | 415 | 362 |
| Example 2 | " | N,N'-4,4'-diphenyl-methanebismaleimide | 0.5/1.0 | 23 | 13.7 | 366 | 351 |
| Example 3 | " | N,N'-4,4'-diphenyl-methanebismaleimide | 0.8/1.0 | 21 | 12.6 | 349 | 341 |
| Example 4** | " | N,N'-4,4'-diphenyl-methanebismaleimide | 0.5/1.0 | 22 | 13.5 | 355 | 349 |
| Example 5 | " | N,N'-m-phenylenebis-maleimide | 0.5/1.0 | 17 | 11.9 | 370 | 353 |
| Example 6 | " | N,N'-p-phenylenebis-maleimide | " | 16 | 11.7 | 370 | 353 |
| Example 7 | " | N,N'-4,4'-diphenyl-etherbismaleimide | 0.5/1.0 | 19 | 12.3 | 362 | 350 |
| Example 8 | p-BAC-M | N,N'-3,3'-diphenyl-sulfonebismaleimide | " | 19 | 11.6 | 364 | 358 |
| Example 9 | " | N,N'-4,4'-diphenyl-1,1-propanebismaleimide | " | 20 | 13.7 | 360 | 351 |
| Example 10 | " | N,N'-2,6-toluylene-bismaleimide | " | 15 | 11.6 | 381 | 349 |
| Example 11 | " | 3,3'-dimethyl-N,N'-4,4'-diphenylmethanebis-maleimide | " | 20 | 13.5 | 379 | 347 |
| Comp. Ex. 1 | 4,4'-diaminodi-phenylmethane (MDA) | N,N'-4,4'-diphenylmethane-bismaleimide | 0.5/1.0 | 10 | 9.2 | 372 | 333 |
| Comp. Ex. 2 | 4,4'-diaminodi-phenylmethane (MDA) | N,N'-4,4'-diphenylether-bismaleimide | " | 11 | 9.7 | 369 | 340 |

*1,3-Bis[4-(4-aminophenoxy)-α, α-dimethylbenzyl]benzene

EXAMPLES 12 TO 14

In a stainless steel reactor equipped with a stirrer, a reflux condenser and a nitrogen inlet pipe, there was placed a mixture of 1,3-bis[4-(4-aminophenoxy)-α,α-dimethylbenzyl]benzene (hereinafter referred to as "p-

BAC-M") and 1,3-bis(3-maleimidophenoxy)benzene in the molar ratios set forth in Table 2. The mixture was heated and melted at 180° C. for 20 minutes. Afterwards, the mixture was cooled to room temperature in order to obtain a brown transparent glassy solidified reaction product. The product was ground, and a yellow fine powder of a partially cured thermosetting resin composition was obtained.

EXAMPLES 16 TO 19 AND COMPARATIVE EXAMPLES 3 AND 4

Each diamine compound and each bismaleimide compound set forth in Table 2 was mixed in the molar ratios set forth in Table 2. Then, the same operation of Examples 12 to 14 was effected. The results are set forth in Table 2.

TABLE 2

| | | Resin Composition | | | | |
|---|---|---|---|---|---|---|
| | Diamine Compound (I) | Bismaleimide Compound (II) | Molar ratio (I)/(II) | Izod impact strength (no notch) (kg·cm/cm) | Bending strength (kg/mm$^2$) | Flexural modulus (kg/mm$^2$) | Starting temp. of thermal decomposition (°C.) |
| Example 12 | p-BAC-M* | 1,3-bis(3-maleimidophenoxy)benzene | 0.2/1.0 | 21 | 11.8 | 421 | 365 |
| Example 13 | " | 1,3-bis(3-maleimidophenoxy)benzene | 0.5/1.0 | 27 | 13.9 | 386 | 353 |
| Example 14 | " | 1,3-bis(3-maleimidophenoxy)benzene | 0.8/1.0 | 22 | 12.7 | 370 | 342 |
| Example 15 | " | 1,3-bis(3-maleimidophenoxy)benzene | 0.5/1.0 | 25 | 13.0 | 387 | 350 |
| Example 16 | " | 2,2-bis[4-(3-maleimidophenoxy)phenyl]propane | 0.5/1.0 | 24 | 12.4 | 380 | 355 |
| Example 17 | " | 4,4'-bis(3-maleimidophenoxy)biphenyl | " | 25 | 12.0 | 387 | 352 |
| Example 18 | " | bis[4-(3-maleimidophenoxy)phenyl] sulfide | " | 24 | 11.8 | 379 | 351 |
| Example 19 | p-BAC-M | bis[4-(3-maleimidophenoxy)phenyl] sulfone | " | 24 | 12.5 | 385 | 351 |
| Comp. Ex. 3 | 4,4'-diaminodiphenylmethane (MDA) | N,N'-4,4'-diphenylmethanebismaleimide | " | 10 | 9.2 | 372 | 333 |
| Comp. Ex. 4 | 4,4'-diaminodiphenylmethane (MDA) | N,N'-4,4'-diphenyletherbismaleimide | " | 11 | 9.7 | 369 | 340 |

*1,3-bis[4-(4-aminophenoxy)-α, α-dimethylbenzyl]benzene

A mold (10×80×4 mm) which had been heated to 180° C. was filled with the composition, and was heated and melted. Compression molding was then carried out by maintaining the composition at 200° C. under 50 kg/cm$^2$ for 30 minutes. After being cooled to room temperature, the molded material was taken out of the mold and postcured in a hot air oven at 250° C. for 4 hours. Test pieces for an Izod impact test and a bending test were obtained. The Izod impact test (no notch) and the bending test were carried out in accordance with JIS-K-6911, and a starting temperature of thermal decomposition was measured at a temperature rise rate of 10° C./minute in air. The results are set forth in Table 2.

EXAMPLE 15

In a reactor equipped with a stirrer, a reflux condenser and a nitrogen inlet pipe, there were in a molar ratio as set forth in Table 2. N-methyl-2-pyrrolidone was poured into the solution in such an amount that the concentration of a resin was 55% by weight. Both components were dissolved, and a reaction was carried out by heating the solution at 130° C. for 50 minutes The resulting brown transparent varnish was added dropwise to water which was being stirred, and the deposited precipitate was then collected by filtration, washed with water, and dried with hot air at 80° C. for 15 hours.

The product was further dried at 110° C. for 20 minutes and additionally at 130° C. for 20 minutes. It was then ground such that a thermosetting resin composition was obtained.

Afterward, the same operation as described in Examples 12 to 14 was followed. The results are set forth in Table 2.

SYNTHESIS EXAMPLE 2

In a reactor equipped with a water separator, there were placed 1490 g (16 mols) of aniline, 280.2 g (1.6 mols) of α,α'-dichloro-p-xylene and 175.2 g (4.8 mols) of a 35% aqueous hydrochloric acid solution. The temperature was increased to the reflux point of aniline while stirring, and while a nitrogen gas was introduced into the reactor. In the course of this operation, water which was distilled off was removed from the system by means of the water separator. This operation was continued for 15 hours to carry out aging, and then the reaction was coded. The resulting reaction solution was cooled to 140° C. and poured into 1600 g of a 18% aqueous caustic soda solution. While stirring, 1000 g of toluene was added to the solution to complete neutralization. After being left to stand, the lower layer of the resulting two separate layers was drawn off. Water washing and liquid separation were then repeated. The obtained oil layer was concentrated in vacuo to recover toluene and unreacted aniline, so that a light yellow transparent oily aromatic amine resin was obtained as a residue.

Yield: 442 g
Composition according to a GPC analysis:
Values of n in the general formula (III)

| n = 0: 76%, | n = 1: 19% |
|---|---|
| n = 2: 4%, | n ≧ 3: 1% |

Average molecular weight: 350
Amine value: 0.65 eq/100 g
This aromatic amine resin was used to prepare a polymaleimide compound.

In a reactor equipped with a water separator, there were placed 20 g of p-toluenesulfonic acid and 800 g of toluene. The solution was then heated under reflux to remove water by azeotropic dehydration. Next, 380 g (3.88 mols) of maleic anhydride was added to the solution, and a solution of 400 g of the above-mentioned aromatic amine resin and 400 g of toluene were added dropwise over 12 hours, while the reflux conditions were maintained. In the course of this operation, water which was distilled off by azeotropy was removed from the system, and toluene was refluxed. After completion of dropping, aging was effected for 3 hours and then the reaction was ended. The total weight of water which was distilled off was 50 g. The resulting reaction solution was cooled to 70° C., and a small amount of insolubles were removed by filtration. Next, 600 g of water was added to the reaction solution, and the solution was retained under reflux for 30 minutes. After standing, the lower layer of the resulting two separate layers was drawn off, and 1000 g of water was added thereto, followed by water washing and liquid separation. This operation was repeated twice. The obtained oil layer was concentrated in vacuo up to 150° C., so that a maleimide compound was obtained as a residue.

The compound was taken out when it was still hot, and cooled, and then ground, to obtain a yellow powdery polymaleimide compound.

Yield: 620 g, Softening point: 94° C.

SYNTHESIS EXAMPLE 3

In a reactor equipped with a water separator, there were placed 930 g (10 mols) of aniline. The temperature was increased, while nitrogen gas was introduced into the reactor. When the internal temperature had reached 150° C., 350.2 g (2 mols) of α,α'-dichloro-p-xylene was divided and then added so that the internal temperature would not rise rapidly. Thereafter, while the internal temperature was maintained at 210° C., aging was effected for 10 hours. Then the reaction was ended. The post-treatments subsequent to the reaction, i.e., neutralization, water washing, liquid separation and concentration, were carried out by the same procedures as in Example 20 to obtain a light yellow transparent aromatic amine resin.

Yield: 490 g
Composition according to a GPC analysis:
Values of n in the general formula (III)

| n = 0: 60%, | n = 1: 25% |
|---|---|
| n = 2: 10%, | n = 3: 4% |
| n ≧ 4: 1% | |

Average molecular weight: 450
Amine value: 0.63 eq/100 g

This aromatic amine resin was used to prepare a polymaleimide compound.

In a reactor equipped with a water separator, there were placed 80 g of a perfluoroalkansulfonic acid-type ion exchange resin (trade name Nafion-H; made by Du Pont) and 800 g of toluene, and 297.6 g (3.2 mols) of maleic anhydride was further added thereto. Afterward, the solution was maintained under conditions of reflux.

A solution was then prepared by dissolving 400 g of the above-mentioned aromatic amine resin in 200 g of N,N-dimethylformamide which was added dropwise to the above-mentioned solution over 10 hours. After the dropping, aging was effected under the reflux for 5 hours. The reaction was then ended. The total weight of water which was distilled off was 49 g. The resulting reaction solution was cooled to 70° C. The catalyst Nafion-H was removed by filtration.

The resulting filtrate was concentrated in vacuo to recover the solvent, i.e., toluene and N,N-dimethylformamide. The product was removed while it was still hot. After cooling, the product was ground to obtain the powder of a crude polymaleimide compound. The powder was subjected to sludging at 40° C. in 2 liters of water overnight. Filtration and water washing followed. A yellow powdery polymaleimide compound was obtained.

Yield: 590 g, Softening point: 102° C.

SYNTHESIS EXAMPLE 4

In a reactor equipped with a water separator, there was placed 558 g (6 mols) of aniline. The temperature was increased while nitrogen gas was introduced into the reactor. When the internal temperature had reached 150° C., 350.2 g (2 mols) of α,α'-dichloro-p-xylene was divided and then added thereto to prevent the internal temperature from rising too rapidly. Afterward, using the same operation as in Synthesis Example 3 a light yellow transparent aromatic amine resin was obtained.

Yield: 460 g
Composition according to a GPC analysis:

| n = 0: 36%, | n = 1: 22%, |
|---|---|
| n = 2: 14%, | n = 3: 9% |
| n = 4: 6%, | n ≧ 5: 13% |

Average molecular weight: 650
Softening point: 56° C.
Amine value: 0.61 eq/100 g Next, 400 g of the aromatic amine resin was used in the same manner as in Synthesis Example 3, and a yellow powdery polymaleimide compound was obtained.

Yield: 580 g, Softening point: 110° C.

EXAMPLES 20 TO 23

In a stainless steel reactor equipped with a stirrer, a reflux condenser and a nitrogen inlet pipe, there were placed the polymaleimide compound obtained in Synthesis Example 2 and 1,3-bis[4-(4-aminophenoxy)-α,α-dimethylbenzyl]benzene in the parts by weight set forth in Table 3. They were then heated and melted at 180° C. for 20 minutes. Afterward, the solution was defoamed at 150° C. under reduced pressure (10 to 15 mmHg) for 30 minutes, and then cooled to room temperature. A brown transparent glassy solidified resin composition was obtained.

A mold which had been heated to 180° C. was filled with the composition which was heated and melted. Compression molding was then carried out by maintaining the composition at 200° C. under 50 kg/cm² for 30 minutes. Afterward, the molded material was removed from the mold and then postcured in an oven at 250° C. for 4 hours. Cured test pieces (length 127 mm, width 12.7 mm and thickness 6.4 mm) were obtained.

For these test pieces, their Izod impact (no notch), bending strength, flexural modulus and the starting temperature of thermal decomposition were measured. The results are set forth in Table 3.

EXAMPLES 24 AND 25, COMPARATIVE EXAMPLES 5 AND 6

Each polymaleimide compound and each diamine compound set forth in Table 3 were used in the ratios of parts by weight in the table. The same operation described with respect to Examples 20 to 23 was effected. The results are set forth in Table 3.

COMPARATIVE EXAMPLE 7

N,N'-4,4'-diphenylmethanebismaleimide and 4,4'-diaminodiphenylmethane were used in the ratio of parts by weight set forth in Table 3, and the same operation described with respect to Examples 20 to 23 was effected. The results are set forth in Table 3.

COMPARATIVE EXAMPLE 8

Kelimide-1050 (made by Nippon Polyimide Co., Ltd.) was used as a thermosetting resin composition, and same operation described with respect to Examples 20 to 23 was effected. The results are set forth in Table 3.

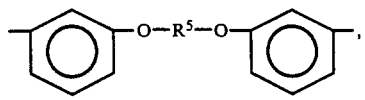

wherein each of $R^2$, $R^3$ and $R^4$ is selected from the group of a hydrogen atom or a methyl group, X represents a direct bond, or X is a member of the group consisting of $CH_2$, an oxygen atom, a sulfur atom, $SO_2$, CO and

and $R^5$ is a divalent group of

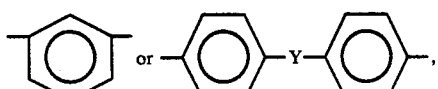

TABLE 3

| | Polymaleimide Compound (III) | | Diamine Compound (I) | | Bending strength (kg/mm²) | Flexural modulus (kg/mm²) | Izod impact strength (no notch) (kg·cm/cm) | Starting temp. of thermal decomposition (°C.) |
|---|---|---|---|---|---|---|---|---|
| Example 20 | Synthesis Example 2 | 100 | p-BACM* | 10 | 14.2 | 475 | 16 | 382 |
| Example 21 | " | 100 | " | 30 | 15.6 | 428 | 18 | 371 |
| Example 22 | " | 100 | " | 50 | 16.7 | 399 | 21 | 360 |
| Example 23 | " | 100 | " | 80 | 15.2 | 381 | 19 | 349 |
| Example 24 | Synthesis Example 3 | 100 | " | 50 | 17.0 | 390 | 20 | 361 |
| Example 25 | Synthesis Example 4 | 100 | " | 50 | 16.9 | 389 | 19 | 363 |
| Comp. Ex. 5 | Synthesis Example 2 | 100 | p-BACM* | 0 | Molding was impossible (some cracks occurred). | | | |
| Comp. Ex. 6 | " | 100 | " | 150 | 8.9 | 342 | 12 | 325 |
| Comp. Ex. 7 | N,N'-4,4'-diphenyl-methanebismaleimide | 100 | 4,4'-diamino-diphenylmethane | 30 | 8.6 | 352 | 9 | 330 |
| Comp. Ex. 8 | Kelimide-1050 (made by Nippon Polyimide) | | | | 8.6 | 352 | 11 | 333 |

*1,3-bis[4-(4-aminophenoxy)-α, α-dimethylbenzyl]benzene

What is claimed is:

1. A thermosetting resin composition comprising a diamine compound represented by formula (I):

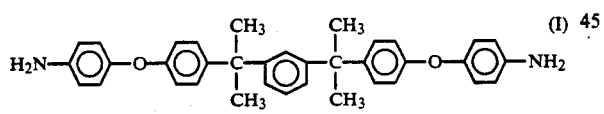

and a bismaleimide compound represented by formula (II):

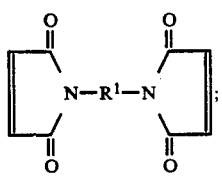

where $R^1$ is

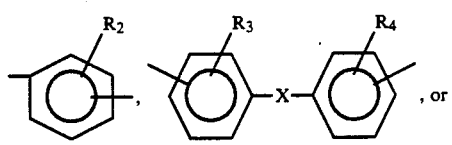

wherein Y represents a direct bond or Y is a member of the group consisting of divalent hydrocarbon groups having 1 to 10 carbon atoms, a hexafluorinated isopropylidene group, a carbonyl group, a thio group, a sulfinyl group, a sulfonyl group and an oxo group, or a polymaleimide represented by formula (III):

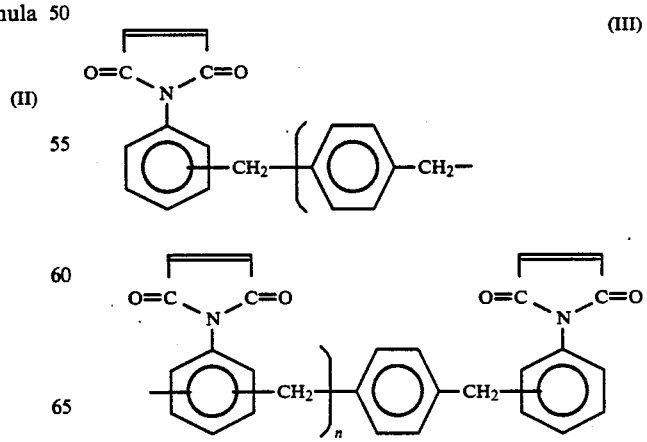

wherein n is an integer of from 0 to 50.

2. A thermosetting resin composition according to claim 1 comprising a diamine compound represented by formula (I):

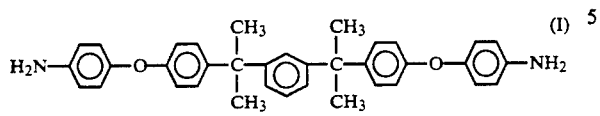

and a bismaleimide compound represented by the formula (II):

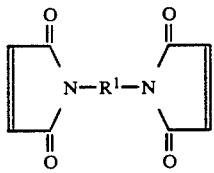

wherein $R^1$ is

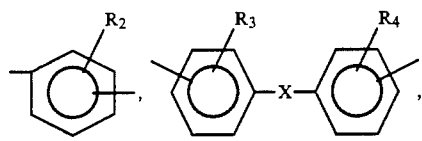

wherein each of $R^2$, $R^3$ and $R^4$ is selected from the group of a hydrogen atom or a methyl group, and X represents a direct bond, or a member of the group consisting of $CH_2$, an oxygen atom, a sulfur atom, $SO_2$,

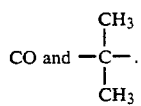

3. A thermosetting resin composition according to claim 1 comprising a diamine compound represented by formula (I):

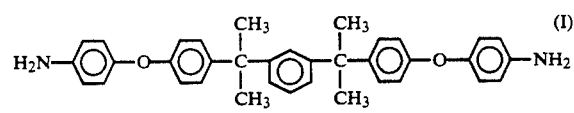

and a bismaleimide compound represented by formula (II):

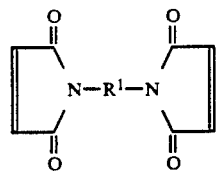

wherein $R^1$ is

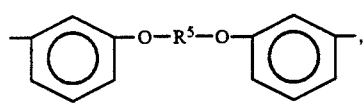

wherein $R^5$ is a divalent group of

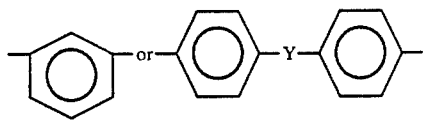

wherein Y represents a direct bond or Y is a member of the group consisting of divalent hydrocarbon groups having 1 to 10 carbon atoms, a hexafluorinated isopropylidene group, a carbonyl group, a thio group, a sulfinyl group, a sulfonyl group and an oxo group.

4. A thermosetting resin composition according to claim 1, comprising a diamine compound represented by formula (I):

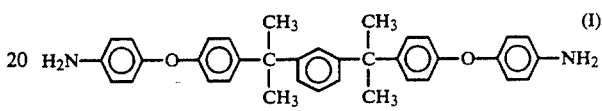

and a polymaleimide represented by formula (III):

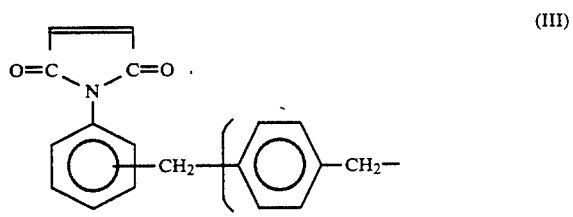

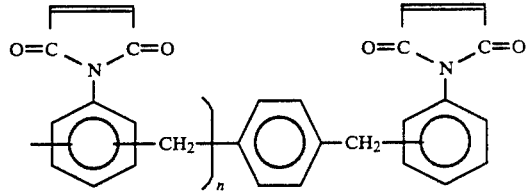

wherein n is an integer of from 0 to 50.

5. A thermosetting resin composition according to claim 2, said bismaleimide compound represented by general formula (II) being at least one member of the group consisting of N,N'-p-phenylenebismaleimide, N,N'-m-phenylenebismaleimide, N,N'-2,6-toluylenebismaleimide, N,N'-4,4'-diphenyletherbismaleimide, N,N'-3,3'-diphenylsulfonbismaleimide, N,N'-4,4'-diphenyl-1,1-propanebismaleimide and 3,3'-dimethyl-N,N'-4,4'-diphenylmethanebismaleimide.

6. A thermosetting resin composition according to claim 3, said bismaleimide compound represented by general formula (II) being at least one member of the group consisting of 1,3-bis(3-maleimidophenoxy)-benzene, 2,2-bis]4-(3-maleimidophenoxy)-phenyl]propane, 4,4'-bis(3-maleimidophenoxy)biphenyl, bis[4-(3-maleimidophenoxy)phenyl] sulfide and bis[4-(3-maleimidophenoxy)phenyl]sulfone.

7. A thermosetting resin composition according to claim 4, said polymaleimide represented by general formula (III) being prepared from maleic anhydride and an aromatic amine represented by general formula (V):

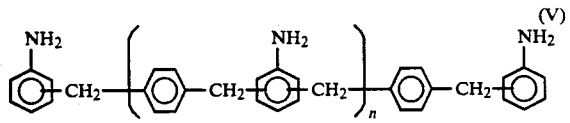

wherein n is an integer of from 0 to 50, and
said aromatic amine represented by general formula (V) being prepared from aniline and an aralkyl derivative represented by the general formula (VI):

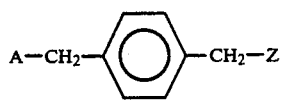

wherein Z is a halogen, a hydroxyl group or an alkoxy group.

8. A thermosetting resin composition according to claim 2 having a blend ratio of said diamine compound of formula (I) to said bismaleimide compound of formula (II) of from 0.1 to 1.2 mols of said diamine compound per mol of said bismaleimide compound.

9. A thermosetting resin composition according to claim 3 having a blend ratio of said diamine compound of formula (I) to said bismaleimide compound of formula (II) of from 0.1 to 1.2 mols of said diamine compound per mol of said bismaleimide compound.

10. A thermosetting resin composition according to claim 4 having a blend ratio of said diamine compound of formula (I) to said polymaleimide of formula (III) of from 5 to 100 parts by weight of said diamine compound per 100 parts by weight of said polymaleimide.

* * * * *

UNITED STATES PATENT AND TRADEMARK OFFICE
CERTIFICATE OF CORRECTION

PATENT NO. : 5,104,962

DATED : April 14, 1992

INVENTOR(S) : Yamaya et al.

It is certified that error appears in the above-identified patent and that said Letters Patent is hereby corrected as shown below:

In column 16, line 50, before "N,N'-4,4'-" insert --N,N'-4,4'-diphenylmethanebismaleimide,--.

In column 16, line 59, amend "2,2-bis]" to --2,2-bis[--.

Signed and Sealed this

Fourteenth Day of September, 1993

Attest:

BRUCE LEHMAN

Attesting Officer

Commissioner of Patents and Trademarks